Nov. 28, 1950     J. H. KUHLMANN     2,531,518
SYNCHRONOUS MOTOR

Filed March 28, 1949

INVENTOR.
JOHN H. KUHLMANN
BY George H Fisher
ATTORNEY

Patented Nov. 28, 1950

2,531,518

UNITED STATES PATENT OFFICE 2,531,518

SYNCHRONOUS MOTOR

John H. Kuhlmann, Minneapolis, Minn., assignor to Minneapolis-Honeywell Regulator Company, Minneapolis, Minn., a corporation of Delaware Application March 28, 1949, Serial No. 83,900

13 Claims. (Cl. 172—278)

This invention relates to small motors of the synchronous type and particularly to self-starting synchronous single-phase motors such as used in timing devices.

It is an object of this invention to provide in a small synchronous motor of this type a field structure whose pole pieces are formed on a plurality of independent rings which are positioned concentric with one another to one side of a main energizing winding and with pole pieces disposed in a cylindrical path extending axially of the motor.

It is also an object of this invention to provide in a synchronous motor of this type a magnetic field structure in which pole piece rings, readily adaptable to punch-press type of manufacture, are assembled with copper shading rings between pairs of said pole piece rings and are disposed to one end of a magnetic energizing core, each pair being energized from opposite ends of said magnetic core, with the pole pieces on said rings extending away from and axially of said core in a circular path.

It is also an object of this invention to provide in a small single phase synchronous motor a simplified magnetic field structure which operates with a low power consumption, high starting torque and low temperature rise.

A further object of this invention is to provide a small synchronous motor design which can be produced and assembled at a low cost.

Figure 2:
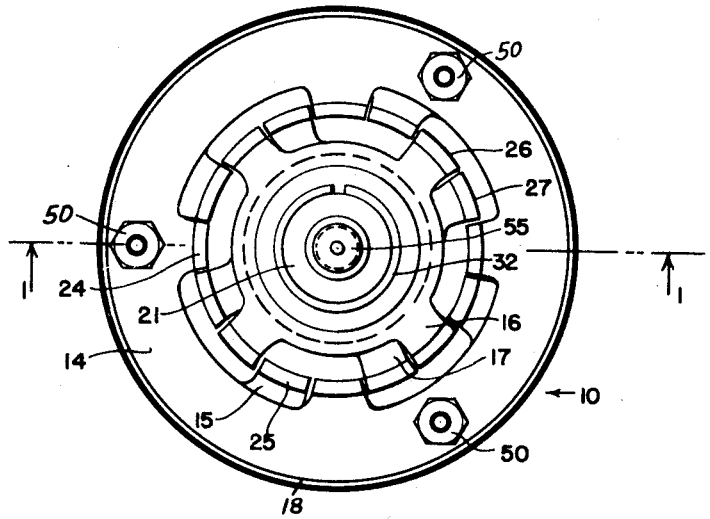
Figure 1:
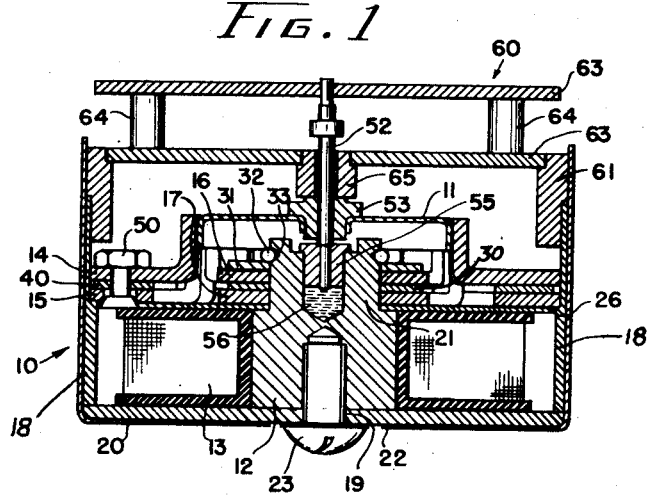

These and other objects of this invention will become apparent from a reading of the appended specification and accompanying drawing, wherein:

Figure 1 is a sectional view of the motor showing the location and arrangement of the parts of the magnetic field structure, and Figure 2 is a top view of the motor with the rotor and gear train removed to show the positioning of the pole pieces of the field structure.

Referring in detail to the drawings, the subject synchronous motor design includes a stator or magnetic field structure generally indicated at 10 and the cooperating rotating inductive element or rotor 11 which under the influence of the magnetic field set up by the stator or field structure is caused to rotate. The magnetic field structure 10 includes generally a magnetic core 12, an energizing winding 13 encircling said magnetic core, and outer and inner sets of pole piece rings 14, 15 and 16, 17 respectively which are energized from said magnetic core. These general parts of the magnetic core are all housed in a cup-shaped member or housing 20 which may be made of any type of material adaptable to punch press or drawing type of manufacture. Magnetic core 12 which is positioned at the geometric center of the cup-shaped housing 20 is cylindrical in form having a reduced portion 21. The magnetic core 12 has a tapped aperture 19 at one end by means of which said core is secured to an end plate 22 of magnetic material positioned in the base of the cup-shaped member 20. A threaded bolt 23 inserted through apertures in the end plate 22 and cup-shaped housing 20 cooperates with a tapped aperture 19 in core 12 to secure the core to the end plate and housing 20. Within the cup-shaped housing 20 is also positioned a cylindrical member 18 of magnetic material which abuts against the end plate 22, and with end plate 22 forms a path for the magnetic flux from the lower end of magnetic core 12 to the outer pole rings 14, 15 as will be later described. Within the structure formed by the cup-shaped housing 20, end plate 22 and the cylindrical member 18, the winding 13 is positioned to encircle the magnetic core. Above the winding 13 is then positioned a nonmagnetic sealing plate 26 which abuts against the cylindrical member 18 at its outer extremity and rests on the shoulder formed in the magnetic core 12 at the reduced portion 21. This cylindrical member 18 may or may not be sealed to the cylindrical housing depending upon whether it is desired to keep any oil which might escape from coming in contact with the winding 13.

Located above the sealing plate 26 and abutting the reduced portion 21 of the magnetic core 12 are the set of inner pole piece rings 16, 17. The rings 16 and 17 are identical in structure each having four pole pieces or teeth 26, 27 thereon respectively which pole pieces are of the same width and are equidistantly spaced from one another. Rings 16 and 17 are separated or spaced apart by a circular copper ring 30 which provides the shading coil or shading means for this portion of the magnetic field structure. With this arrangement, the upper ring 16 and its pole pieces 26 thereon are the shaded pole pieces and the lower ring 17 with its pole pieces 27 thereon are the unshaded pole pieces. The rings 16 and 17 are so positioned relative to one another that the individual pole pieces 26, 27 thereon form pairs of shaded and unshaded pole pieces with a smaller angular spacing between the pole pieces of each pair than between the consecutive pairs of pole pieces on this set of inner pole piece rings. The actual spacing between the pairs of pole pieces on this inner set of pole piece rings is such as to accommodate similar pairs of shaded and unshaded pole pieces from the outer pole piece rings, as will later be noted. The inner set of pole piece rings 16, 17 with the shading coil 30 therebetween is held in place on the sealing plate 26 and abutting the reduced portion 21 of the magnetic core 12 by means of a washer 31 and a clamping spring 32 which fits into a grooved portion 33 on the reduced section 21 of the magnetic core. With this assembly of parts the inner pole piece rings and the sealing plate are secured to the magnetic core 12.

Also positioned above the sealing plate 26 and abutting the cylinder or cylindrical member 18 is the outer set of pole piece rings 14, 15. These outer rings are identical in structure each having four pole pieces 24, 25 respectively thereon which pole pieces for each ring are of the same width and are equidistantly spaced apart. The rings 14, 15, and hence the pole teeth 24, 25 thereon are separated by an annular copper ring or shading means 40 which ring provides for shading the upper ring 24, as seen in Figure 1 and hence for shading the poles 24. The lower ring 15 and hence its pole pieces 25 thereon are not affected by the shading means 40 and hence present the unshaded pole pieces for the outer set of pole piece rings. Rings 14, 15 are so positioned relative to one another that the pole pieces 24, 25 thereon form pairs of poles each pair having a shaded and an unshaded pole with a smaller angular spacing between the pole pieces of each pair than between the consecutive pairs of pole pieces. As noted in Figure 2, the spacing between the pairs of pole pieces on the outer pole piece rings is such to provide a space for the insertion of the consecutive pairs of pole pieces on the inner pole piece rings. The pole pieces of the outer and inner sets of pole piece rings are also disposed in a circular or cylindrical path which is spaced concentric with the magnetic core and hence the axis of the motor as will be later noted. With this arrangement the pole pieces 24, 25, 26 and 27 are all of the same width, and are positioned to have the same angular spacing between consecutive pole pieces along the cylindrical path formed by the pole pieces. The inner and outer pole piece rings 14 and 15 with the shading means 40 therebetween are attached to the sealing plate 26 and clamped together by means of a bolt and nut connections 50. Three such connections secure rings 14 and 15 to the plate 26 and since, as was heretofore noted, the plate 26 is secured to the magnetic core 12 a compact and rigid assembly of pole piece rings and pole pieces is obtained.

Positioned within the cylindrical path or structure formed by the pole pieces 24, 25, 26 and 27 is the rotor 11 which is a cup-shaped member of magnetic material having a high magnetic retentivity. Rotor 11 is secured to a shaft 52 by means of a bushing 53 mounted on the shaft 52. The rotor is shown as being press fitted onto bushing 53 and the bushing press fitted onto shaft 52, but any type of method of attachment can be used which will provide a rigid secure structure. One end of shaft 52 fits into a brass bushing 55 which is located in an aperture 56 which is located in the upper or reduced portion 21 of the magnetic core 12. This aperture into which the bushing 55 is partially inserted is designed to contain the fluid or lubricant for the motor. Bushing 55, as shown in Figure 1, has a ridge or shoulder thereon which permits a press fit of the bushing into the aperture 56 to provide a substantially liquid type seal for this reservoir formed in the aperture by the bushing 55. The extremity of the shaft 52 extends through the bushing 55 and into contact with the fluid to permit lubrication of the shaft. The portion of the shaft 52 inserted into the bushing 55 is of a reduced diameter from the remaining section of the shaft and hence a shoulder or ridge of the shaft rests on the upper surface of the bushing 55 in the bearing surface or relationship thus spacing the rotor 11 at a particular level with respect to the pole pieces.

The opposite end of shaft 52 is journaled in a gear assembly 60 which assembly is mounted on the cup-shaped member 20 by means of a sleeve 61. The sleeve 61 has a ridge therein which fits down in contact with the cylindrical member 18 and in contact with the walls of the cup-shaped member 20 such that it is spaced from the remaining portion of the magnetic field structure being press fitted into such position. The gear train assembly 60 is shown only in part in the drawing, the gears and pinions being omitted since they form no part of this invention. The assembly 60 however includes two brass side plates 63 which are held together in spaced relationship by bushings 64 and which mount in a groove in the sleeve 61 attached to the cup-shaped member 20. One of the side plates 63 contains a bushing or bearing 65 for journaling the opposite end of shaft 52 and the other side plate has an aperture therethrough which guides or aids in the support of the shaft.

The operation of this synchronous motor is somewhat similar to that of the known synchronous clock motor design. The design and arrangement of the parts of the magnetic field structure for this motor, however, permit ease in manufacture and assembly, the utilization of the simplest type of shading means, and the production of a highly efficient device for motors of this type at relatively low cost. In operation, the energizing winding 13 magnetizes the core 12 such that its extremities take on definite magnetic polarities. The flux lines emanating from either end of this magnetic core are transmitted to the respective pole pieces of the outer and inner sets of rings to produce a rotating magnetic field which acts upon the magnetic rotor to cause rotation of the same. The pole pieces on the inner pole piece rings 16, 17 are energized by the flux emanating from the reduced portion 21 of the magnetic core 12 which instantaneously has a polarity opposite to the flux lines emanating from the end of the core common to the end plate 22. The flux lines entering the lower pole ring 17 pass directly to the rotor and through the rotor to the opposite or unshaded pole on the outer rings back through the cylindrical member 18, the end plate 22 to the opposite end of the magnetic core 12. This path does not include a copper shading ring and hence this flux is not impeded or shaded by that member. The upper pole piece ring 16 is energized by flux which does traverse or pass through that portion of the core encircled by the shading ring 30 and hence the magnetic flux in this ring is shaded or impeded by the flux lines set up due to the current induced in the shading coil 30. The flux lines in the shaded pole members similarly pass through the rotor and on out to opposite shaded pole members completing the magnetic circuit as through the cylindrical member 18, and end plate 22 as heretofore described. The outer pole rings 14, 15 are similarly energized from the opposite end of the magnetic core 12 or that end, common to the end plate 22. The path for the flux lines emanating from this end of the core includes the end plate 22, the cylindrical member 18, the outer rings, rotor, the inner rings and back to the magnetic core 12. The outer pole rings 14, 15 which are in abutting relationship with the cylindrical member 18 receive the flux carried from this end of the magnetic core which flux bears a polarity opposite to the flux received at the inner set of pole rings. Upper pole ring 14 in this instance is the shaded pole since the flux lines traveling from member 18 through the pole ring 14 pass through the rotor 11 and on to the pole pieces of the inner pole piece ring. At this point they pass through or thread the outer shading ring 40 hence setting up in that shading ring an induced current which impedes the flux or shades the flux through this upper pole ring and its associated pole pieces. The lower or unshaded pole ring 15 receives flux which does not pass through or thread the shading ring 40 and hence these poles are unshaded. The pole pieces for the inner and outer sets of rings 14, 15, 16 and 17 are as heretofore positioned in pairs, each pair comprising a shaded and an unshaded pole from either the inner or outer set. With this arrangement a uniform rotating flux field is obtained which acts upon the magnetic rotor to cause it to rotate. Initially the rotor acts as an eddy current device but once synchronous speed is obtained the rotor becomes magnetized or polarized with a definite polar relationship and the device locks into synchronism at a synchronous speed to maintain a true synchronous operation.

In considering this invention, it should be kept in mind that the present disclosure is illustrative only of synchronous motor operation. It should be kept in mind that with a change in the rotating element of this motor it will be possible to make a device incorporating the novel features of this magnetic field structure which operates as an induction, eddy current or hysteresis motor. For this reason the scope of this invention should be determined only by the appended claims.

I claim as my invention:

1. In a synchronous motor, a magnetic core with an energizing winding thereon, a magnetic field structure energized by said magnetic core and including a plurality of inner and outer pole piece rings, said inner and outer pole piece rings being located at one end of said magnetic core and each having pole pieces thereon which are positioned axially of said magnetic core and extend in the same direction, shading means located between said pole piece rings to provide rings of shaded and rings of unshaded pole pieces, said outer and inner pole piece rings being so positioned that the pole pieces thereon form pairs of shaded and unshaded pole pieces with a greater spacing between said pairs than between the pole pieces of each pair, a cup-shaped structure of magnetic material connecting one end of said magnetic core to said outer pole piece rings, means connecting said inner pole piece rings to the opposite end of said magnetic core, and a rotor magnetically associated with said magnetic field structure.

2. In a synchronous motor, a magnetic core with an energized winding thereon, a magnetic field structure energized by said magnetic core and including inner and outer pole piece rings, said inner and outer pole piece rings being located at one end of said magnetic core and having pole pieces thereon which extend in the same direction axially of said magnetic core, shading means associated with said pole piece rings to provide rings of shaded and rings of unshaded pole pieces, said outer and inner rings being so positioned that the pole pieces thereon form a cylindrical path, a cup-shaped structure of magnetic material connecting one end of said magnetic core to said outer pole piece ring, means connecting said inner pole piece ring to the opposite end of said magnetic core, and a rotor magnetically associated with said magnetic field structure.

3. In a synchronous motor, a magnetic core with an energizing winding thereon, a magnetic field structure energized by said magnetic core and including a plurality of inner and outer pole piece rings, said inner and outer pole piece rings being located at one end of said magnetic core and each having pole pieces thereon which are positioned axially of said magnetic core and extend in the same direction, shading means located between said pole piece rings to provide rings of shaded and rings of unshaded pole pieces, said outer and inner pole piece rings being so positioned that the pole pieces thereon form pairs of shaded and unshaded pole pieces with a greater spacing between said pairs than between the pole pieces of each pair, said pole pieces of said inner and outer pole piece rings being disposed equidistantly from said magnetic core, a cup-shaped structure of magnetic material connecting one end of said magnetic core to said outer pole piece rings, means connecting said inner pole piece rings to the opposite end of said magnetic core, and a rotor magnetically associated with said magnetic field structure.

4. In a synchronous motor, a magnetic core with an energizing winding thereon, a magnetic field structure energized by said magnetic core and including a plurality of inner and outer pole piece rings, said inner and outer pole piece rings being located at one end of said magnetic core and each having pole pieces thereon which are positioned axially of said magnetic core and extend in the same direction, shading means located between said pole piece rings to provide rings of shaded and rings of unshaded pole pieces, said outer and inner pole piece rings being so positioned that the pole pieces thereon form pairs of shaded and unshaded pole pieces with a greater spacing between said pairs than between the pole pieces of each pair, a cup-shaped structure of magnetic material connecting one end of said magnetic core to said outer pole piece rings, means connecting said inner pole piece rings to the opposite end of said magnetic core, said pole pieces of said inner and outer pole piece rings being so disposed to form a circular structure, and a rotor of high magnetic retentivity disposed to rotate within said circular structure.

5. In a synchronous motor, a magnetic core with an energizing winding thereon, a magnetic field structure energized by said magnetic core and including a plurality of inner and outer pole piece rings, said inner and outer pole piece rings being located at one end of said magnetic core and having pole pieces thereon which are positioned axially of said magnetic core extending in the same axial direction, shading means located between the rings of said inner and outer pole piece rings to provide rings of shaded and rings of unshaded pole pieces, said outer and inner pole piece rings being so positioned that the pole pieces thereon form pairs of pole pieces, each pair having a shaded and an unshaded pole piece with a larger spacing between said pairs than between the pole pieces of each pair, a cup-shaped structure of magnetic material connecting one of said magnetic core to said other pole piece rings, means connecting said inner pole piece rings to the opposite end of said magnetic core, said pole pieces of said inner and outer pole piece rings being spaced apart equidistantly along a circular path common to all of said pole pieces, and a rotor of high magnetic retentivity mounted for rotation within said circular path.

6. In a synchronous motor, a magnetic core with an energizing winding thereon, a magnetic field structure energized by said magnetic core and including a plurailty of inner and outer pole piece rings, said inner and outer pole piece rings being located at one end of said magnetic core and having pole pieces thereon which are positioned axially of said magnetic core, shading means located between the rings of said inner and outer pole piece rings to provide rings of shaded and rings of unshaded pole pieces, said outer and inner pole piece rings being so positioned that the pole pieces thereon form pairs of pole pieces, each pair having a shaded and an unshaded pole piece with a larger spacing between said pairs than between the pole pieces of each pair, a cup-shaped structure of magnetic material connecting one of said magnetic core to said other pole piece rings, means connecting said inner pole piece rings to the opposite end of said magnetic core, said pole pieces of said inner and outer pole piece rings being spaced apart equidistantly along a circular path common to all of said pole pieces, and a rotor of high magnetic retentivity mounted for rotation within said circular path.

7. In a synchronous motor, a magnetic core with an energizing winding thereon, a magnetic field structure energized by said magnetic core and including a plurality of inner and outer pole piece rings, said inner and outer pole piece rings being located at one end of said magnetic core and having pole pieces thereon which are positioned axially of said magnetic core extending in the same direction, an annular copper disk located between the rings of said inner and outer pole piece rings to provide rings of shaded and rings of unshaded pole pieces, said outer and inner pole piece rings being so positioned that the pole pieces thereon form pairs of pole pieces, each pair having shaded and unshaded pole pieces with the pole pieces of each pair common to either the inner or the outer pole piece rings, said pairs of pole pieces on both the inner and outer pole piece rings being so spaced apart sufficient to accommodate the pairs of pole pieces of the opposite pole piece rings, a cup-shaped structure of magnetic material connecting one end of said magnetic core to said outer pole piece rings, means connecting said inner pole piece rings to the opposite end of said magnetic core, and a rotor magnetically associated with said magnetic field structure.

8. In a synchronous motor, a magnetic core, a cup-shaped structure of magnetic material surrounding said magnetic core and attached at one extremity thereof, an energizing winding positioned on said magnetic core and within said cup-shaped structure, an outer set of pole piece rings in abutting relationship with said cup-shaped structure at a point from the attachment of said structure and said magnetic core, each of said outer pole piece rings having pole pieces thereon spaced equidistantly apart and extending axially of said magnetic core in the same direction, an annular copper ring located between the pole piece rings of said outer set, an inner set of pole piece rings positioned at the other end of said magnetic core remote from said cup-shaped structure, said inner rings having pole pieces thereon spaced equidistantly apart and extending axially of said magnetic core in the same direction, an annular copper ring located between said inner pole piece rings, said rings of said inner and outer pole piece sets being positioned respectively to form pluralities of pairs of pole pieces each pair having shaded and unshaded poles from a common set and so spaced that a smaller opening is provided between the pole pieces of each pair than between each pair of pole pieces on the respective sets of ring, said inner and outer sets of rings being so positioned with respect to one another that the pole pieces thereon lie in a circular path which is common to all pole pieces, and a rotor of high magnetic retentivity journaled in said magnetic core and positioned to rotate within said circular path.

9. In a synchronous motor, a magnetic core, a cup-shaped structure of magnetic material surrounding said magnetic core and attached at one extremity thereof, an energizing winding positioned on said magnetic core and within said cup-shaped structure, an outer set of pole piece rings in abutting relationship with said cup-shaped structure at a point from the attachment of said structure and said magnetic core, each of said pole piece rings having pole pieces thereon spaced equidistantly apart and extending axially of said magnetic core, an annular copper ring located between the pole piece rings of said outer set, an inner set of pole piece rings positioned at the other end of said magnetic core remote from said cup-shaped structure, said inner rings having pole pieces thereon spaced equidistantly apart and extending axially of said magnetic core, an annular copper ring located between said inner pole piece rings, said rings of said inner and outer pole piece sets being positioned respectively to form pluralities of pairs of pole pieces each pair having shaded and unshaded poles from a common set and so spaced that a smaller opening is provided between the pole piece of each pair and between each pair of pole pieces on the respective sets of ring, said inner and outer sets of rings being so positioned with respect to one another that the pole pieces thereon lie in a circular path which is common to all pole pieces, and a rotor of high magnetic retentivity journaled in said magnetic core and positioned to rotate within said circular path.

10. In a synchronous motor, a magnetic core, a cup-shaped structure of magnetic material surrounding said magnetic core and attached at one extremity thereof, an energizing winding positioned on said magnetic core and within said cup-shaped structure, an outer set of pole piece rings in abutting relationship with said cup-shaped structure at a point from the attachment of said structure and said magnetic core, each of said pole piece rings having pole pieces thereon spaced equidistantly apart and extending axially of said magnetic core, an annular copper ring located between the pole piece rings of said outer set, an inner set of pole piece rings positioned at the other end of said magnetic core remote from said cup-shaped structure, said inner rings having pole pieces thereon spaced equidistantly apart and extending axially of said magnetic core, an annular copper ring located between said inner pole piece rings, said rings of said inner and outer pole piece sets being so positioned respectively to form pluralities of pairs of pole pieces each pair having shaded and unshaded poles from a common set and so spaced that a smaller opening is provided between the pole piece of each pair and between each pair of pole pieces on the respective sets of ring, said pairs of pole pieces on both the inner and outer pole piece rings being spaced apart sufficient to accommodate the pairs of pole pieces of the opposite sets of rings with the pole pieces of said pairs being disposed in a circular path concentric with said magnetic core, and a rotor of high magnetic retentivity positioned to rotate within said circular path.

11. In a synchronous motor, a magnetic core, a cup-shaped structure of magnetic material surrounding said magnetic core and attached at one extremity thereof, an energizing winding positioned on said magnetic core and within said cup-shaped structure, an outer set of pole piece rings in abutting relationship with said cup-shaped structure at a point from the attachment of said structure and said magnetic core, each of said pole piece rings having pole pieces thereon spaced equidistantly apart and extending axially of said magnetic core, an annular copper ring located between the pole piece rings of said outer set, an inner set of pole piece rings positioned at the other end of said magnetic core remote from said cup-shaped structure, said inner rings having pole pieces thereon spaced equidistantly apart and extending axially of said magnetic core, an annular copper ring located between said inner pole piece rings, said rings of said inner and outer pole piece sets being so positioned respectively to form pluralities of pairs of pole pieces each pair having shaded and unshaded poles from a common set and so spaced that a smaller opening is provided between the pole piece of each pair and between each pair of pole pieces on the respective sets of ring, said pairs of pole pieces on both the inner and outer pole piece rings being spaced apart sufficient to accommodate the pairs of pole pieces of the opposite sets of rings with the pole pieces of said pairs being disposed in a circular path concentric with said magnetic core, and a rotor of high magnetic retentivity magnetically associated with said pole pieces.

12. In a synchronous motor, a magnetic core with an energized winding thereon, a magnetic field structure energized by said magnetic core and including inner and outer pole piece rings, said inner and outer pole piece rings being located at one end of said magnetic core and having pole pieces thereon which are positioned axially of said magnetic core, shading means associated with said pole piece rings to provide rings of shaded and rings of unshaded pole pieces, said outer and inner rings being so positioned that the pole pieces thereon form a cylindrical path, a cup-shaped structure of magnetic material connecting one end of said magnetic core to said outer pole piece ring, means connecting said inner pole piece ring to the opposite end of said magnetic core, and a rotor magnetically associated with said magnetic field structure.

13. In a synchronous motor, a magnetic core with an energizing winding thereon, a magnetic field structure energized by said magnetic core and including inner and outer pole piece rings, said inner and outer pole piece rings being located in the same relative position with respect to said magnetic core and having pole pieces thereon which extend in the same direction axially of said magnetic core, shading means associated with said pole piece rings to provide rings of shaded and rings of unshaded pole piece rings being so positioned that the pole pieces thereon lie in a circular path, a cup-shaped structure of magnetic material connecting one end of said magnetic core to said outer piece of said ring, means connecting said inner pole piece ring to the opposite end of said magnetic core, and a rotor disposed to rotate within said circular path.

JOHN H. KUHLMANN.

REFERENCES CITED

The following references are of record in the file of this patent:

UNITED STATES PATENTS

| Number | Name | Date |
|---|---|---|
| 2,292,265 | Carpenter | Aug. 4, 1942 |

FOREIGN PATENTS

| Number | Country | Date |
|---|---|---|
| 489,246 | Great Britain | July 22, 1938 |